(12) United States Patent
Khan et al.

(10) Patent No.: US 9,995,360 B2
(45) Date of Patent: Jun. 12, 2018

(54) BEARING WITH SPHERICAL ROTATIONAL DAMPING

(71) Applicant: Trench Limited, Scarborough (CA)

(72) Inventors: Kamran Khan, Toronto (CA); Andrew Lang, Toronto (CA)

(73) Assignee: SIEMENS AKTIENGESELLSCHAFT, München (DE)

( * ) Notice: Subject to any disclaimer, the term of this patent is extended or adjusted under 35 U.S.C. 154(b) by 16 days.

(21) Appl. No.: 15/036,427

(22) PCT Filed: Nov. 19, 2013

(86) PCT No.: PCT/CA2013/050883
§ 371 (c)(1),
(2) Date: May 13, 2016

(87) PCT Pub. No.: WO2015/074132
PCT Pub. Date: May 28, 2015

(65) Prior Publication Data
US 2016/0290429 A1  Oct. 6, 2016

(51) Int. Cl.
*F16F 9/00* (2006.01)
*F16F 9/10* (2006.01)
(Continued)

(52) U.S. Cl.
CPC ............ *F16F 9/10* (2013.01); *F16C 11/0614* (2013.01); *F16C 11/08* (2013.01); *F16F 15/023* (2013.01);
(Continued)

(58) Field of Classification Search
CPC ........ F16F 7/01; F16F 7/02; F16F 9/10; F16F 15/023; F16M 7/00; F16M 11/14; F16C 11/08; F16C 11/0614; F16C 220/041
See application file for complete search history.

(56) References Cited

U.S. PATENT DOCUMENTS

| 2,755,116 A | * | 7/1956 | Alldredge | ........... F16C 11/0609 |
| | | | | 188/268 |
| 3,141,523 A | * | 7/1964 | Dickie | ...................... F16F 7/01 |
| | | | | 188/268 |
| 3,348,796 A | * | 10/1967 | Baratoff | .................... F16F 7/02 |
| | | | | 188/268 |

FOREIGN PATENT DOCUMENTS

GB    588137 A    5/1947

OTHER PUBLICATIONS

PCT International Search Report dated Jul. 17, 2014 corresponding to PCT International Application No. PCT/CA2013/050883 filed Nov. 19, 2013 (8 pages).

\* cited by examiner

*Primary Examiner* — Melody M Burch

(57) ABSTRACT

A damping bearing (34, 36) provides relative rotations between first and second subassemblies about a point (40). The first subassembly includes a fluid containment vessel (26, 26C, 26D) containing a fluid (32). The second subassembly includes a plunger (42) with a fluid deformation element (46, 46B) immersed in the fluid. The relative rotations are damped by viscosity of the fluid resisting motions of the fluid deformation element. Damping is especially effective in multiple planes containing a given line (23 or 43) through the point (40). The plunger may have rotational symmetry, and may be cylindrical about the given line. Lateral fluid bounding surfaces (50, 52, 52D) of the containment vessel may be spherical about the point, or may be shaped to provide clearance to the deformation element that varies with angular displacement between the first and second subassemblies to provide a predetermined damping profile.

13 Claims, 3 Drawing Sheets

(51) Int. Cl.
    *F16F 15/023* (2006.01)
    *F16M 7/00* (2006.01)
    *F16M 11/14* (2006.01)
    *F16C 11/08* (2006.01)
    *F16C 11/06* (2006.01)
    *F16F 13/00* (2006.01)
(52) U.S. Cl.
    CPC .............. *F16M 7/00* (2013.01); *F16M 11/14* (2013.01); *F16M 2200/041* (2013.01)

BEARING WITH SPHERICAL ROTATIONAL DAMPING

FIELD OF THE INVENTION

This invention relates generally to bearings, and more specifically to a bearing used in the leg of a supported object that damps lateral oscillations of the object.

BACKGROUND OF THE INVENTION

Damping is an expression of the ability of a structure to dissipate kinetic energy when subjected to loading. Most structures have some inherent ability to damp. A level of damping is associated with a particular form, material, construction method, or level of stress of a structure. If a structure dissipates more kinetic energy than would normally be attributed to that type of structure, then there may be a reduction in loading for certain types of exciting forces. This, in turn, allows a reduction in strength requirements of the structure, and thus a cost saving.

An electric power line reactor is an electrical component having one or more inductor elements connected between a power source and an electrical load. The reactor opposes rapid changes in current. Thus it attenuates spikes of current and limits peak currents among other specialized applications. Reactors can generate forces internally resulting in loads that must be accommodated by their support structure. As well, reactors are subject to external loading from wind, seismic, transportation and industrial vibration. They also need separation from the ground by electrical insulators and distance, which may result in support legs which inherently have some lateral flexibility that allows oscillations. Linear dampers are known. Torsional and other rotational dampers are also known. Current damping devices for such support structures are expensive and large, requiring extra real estate below the reactor.

BRIEF DESCRIPTION OF THE DRAWINGS

The invention is explained in the following description in view of the drawings that show.

DETAILED DESCRIPTION OF THE INVENTION

Figure 1:
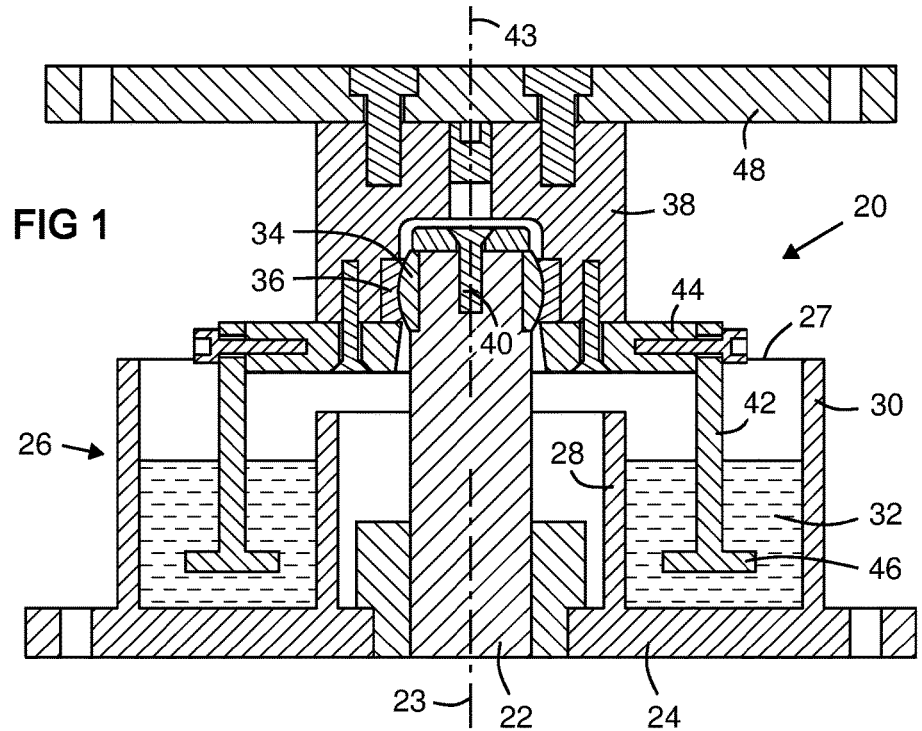
FIG. 1 is a side sectional view of a damping bearing apparatus showing aspects of an embodiment of the invention.

FIG. 1 is a side sectional view of a damping bearing assembly 20 according to aspects of an embodiment of the invention. A support shaft 22 may be attached to a bottom mounting plate 24 that is mountable to a foundation or leg. The shaft 22 is considered to have a centerline or axis 23. A fluid containment vessel 26 is defined by inner and outer walls 28, 30 on the bottom mounting plate. The inner wall need not be supplied. The containment walls 28, 30 may be cylindrical as illustrated in FIG. 1, or they may have other shapes as later shown. A fluid 32 providing a design viscosity is disposed in the containment vessel 26. A flexible boot or other cover (not shown herein) may seal the top opening 27 of the containment vessel. A pressure seal for the fluid 32 is not needed in this embodiment, since it may be retained by gravity. A spherical bearing is provided by a ball portion 34 on a top end of the support shaft 22 and a socket portion 36 mounted in a bearing housing 38. Thus the housing 38 is supported on the shaft 22 for rotation about a point 40. A plunger 42 is attached to the housing 38, either directly or via an attachment element 44 such as a plate. The plunger may take the shape of a solid of rotation about an axis 43, which axis may include the center of rotation 40. For example, the plunger may be cylindrical. A lower portion of the plunger is immersed in the fluid 32 and may have one or more fluid deformation elements 46 such as a laterally extending flange or "potato masher" element as shown. A top mounting plate 48 may be attached to the bearing housing 38 to support a structure or apparatus such as an electrical reactor coil or other apparatus that experiences lateral oscillations.

Figure 2:
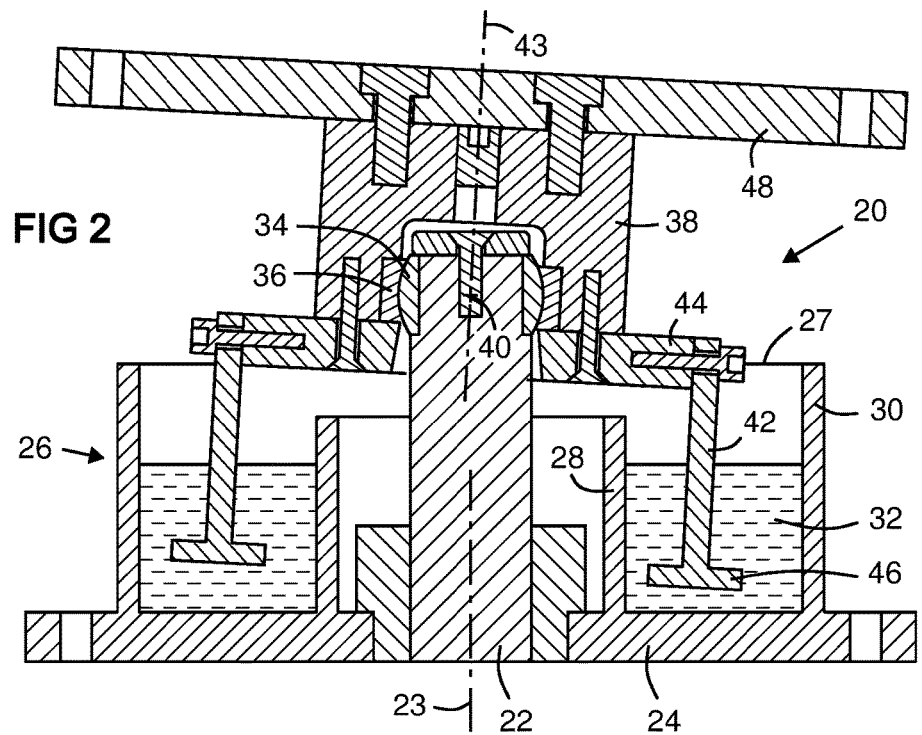
FIG. 2 shows the apparatus of FIG. 2 with a deflected position of the upper subassembly relative to the lower subassembly.

FIG. 2 shows the device of FIG. 1 with the upper subassembly deflected 3 degrees, exemplifying a deflection by an oscillating reactor or other structure or apparatus supported thereon. Experiments were performed on this embodiment using a 20-foot weighted pendulum as an oscillating mass for test purposes. This embodiment achieved up to about a 10% damping ratio in the rotational plane of movement using a polyimethylsiloxane damping fluid with a viscosity of 100,000 centistrokes at a frequency of approximately 2 Hz.

"Spherical damping" herein means damping of rotations about a point in multiple non-parallel planes, especially damping in planes of a given line that includes the rotation center point. The given line for this specification may be the axis 23 of the support shaft or a vertical line through the center of rotation 40. Alternately, the given line may be the axis 43 of a solid of rotation that forms the plunger 42. Planes that include the latter axis 43 and the rotation center 40 are the most effective damping planes of this device in the embodiments shown. These are also the most useful planes for damping lateral oscillations of a reactor or other apparatus via damped legs. Spherical damping is distinguished from rotary or torsional damping, which only damp rotations around an axis in a plane or planes normal to the axis. It is also distinguished from linear damping, which only damps linear motions along or parallel to an axis.

Figure 3:
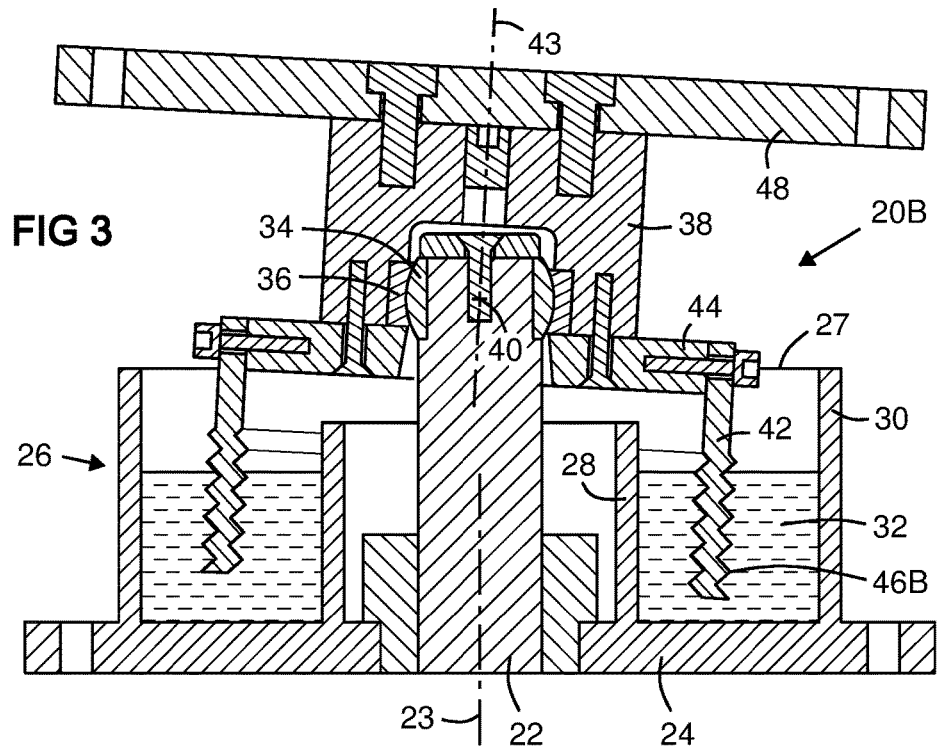
FIG. 3 shows another embodiment of the invention with a corrugated fluid deformation element.

FIG. 3 shows an embodiment 20B of the invention with an alternate fluid deformation element 46B having a corrugated or "washboard" geometry with alternating ridges and furrows in a generally cylindrical solid of rotation. One will appreciate that other shapes of fluid deformation elements may be envisioned, including plates having holes for the passage of the fluid, flexible structures that deform under load to provide a passive limit on damping for high velocity oscillations, or any other apparatus submerged or in contact with the viscous fluid. As well, elements which may take the form of a ring may be placed on either side of element 46B and provide damping by the interaction of the elements and the fluid between the parts.

Figure 4:
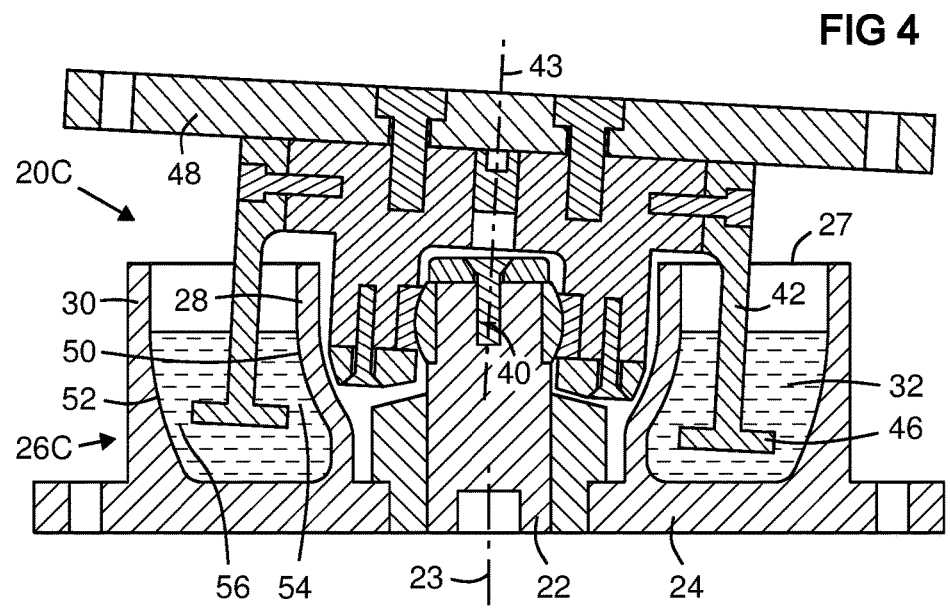
FIG. 4 shows another embodiment of the invention with spherical fluid containment surfaces.

FIG. 4 shows an embodiment 20C of the invention with a containment vessel 26C with curved containment surfaces 50, 52 of the inner and outer fluid containment walls 28, 30. The shapes of these surfaces maintain constant clearance gaps 54, 56 between the containment walls 28, 30 and the fluid deformation element 46 throughout the designed limits of travel. Such curved surfaces allow the gaps 54, 56 to be as small as desired, since the fluid deformation element 46 cannot interfere with the walls. This in turn allows the damping effect to be as strong as desired, depending inversely on the gap widths.

Figure 5:
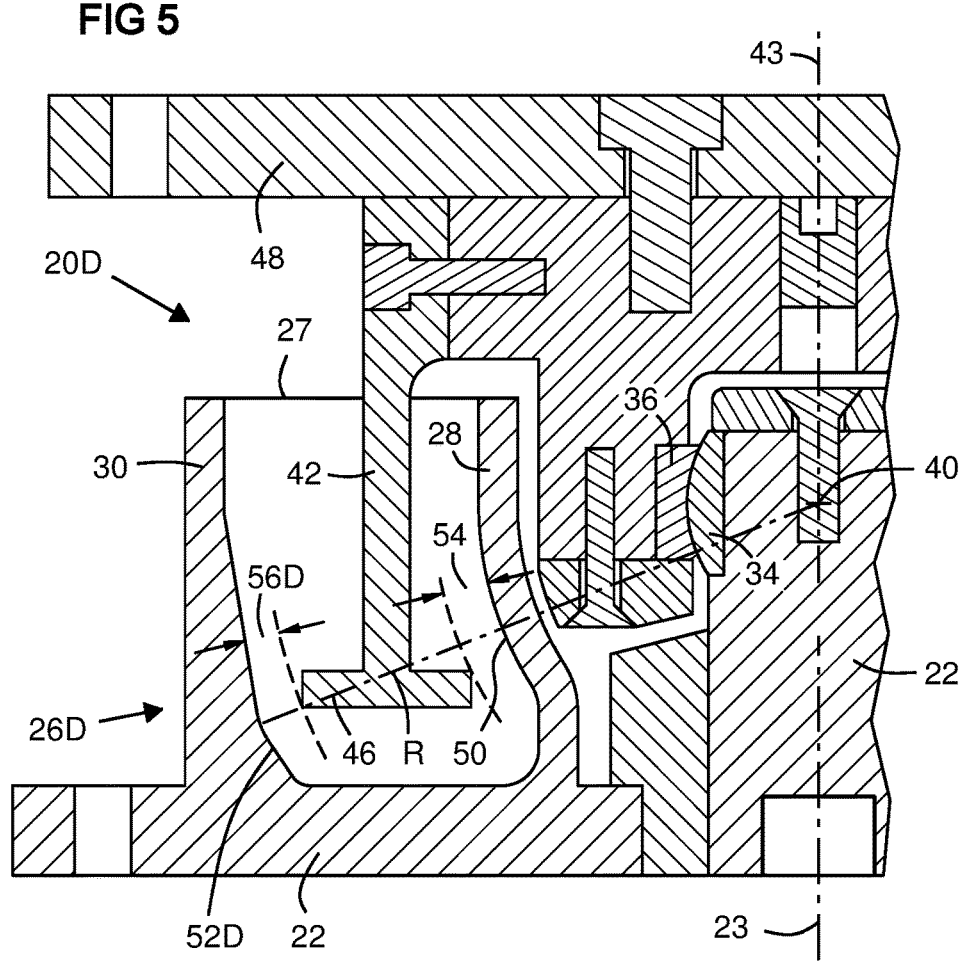
FIG. 5 shows a partial enlargement of an embodiment of the invention without fluid.

FIG. 5 shows an embodiment 20D of the invention with a containment vessel 26D having a curved (spherical) lateral containment surface 50 on the inner wall 28, and a non-spherical containment surface 52D on the outer wall 30. The first surface 50 provides a constant gap 54 between the inner containment wall 28 and the fluid deformation element 46 over any amount of deflection. The second surface 52D provides a gap 56D that varies with deflection. In this example, the gap 56D is greatest at the neutral or zero deflection position, defined here by radius R. The gap may decrease symmetrically about R in both directions of rotation in each plane of the plunger axis 43 or the shaft axis 23. Thus, damping increases with deflection for a given velocity of the deformation element 46. However, this velocity is normally maximal as it crosses the neutral position R, so the illustrated profile of the surface 52D makes the damping force more uniform for large deflection oscillations because the velocity slows at the extremes of the oscillations. This is just one example of variations in the shape and spacing of the lateral surfaces of the chamber walls 28, 30 that can provide any desired spherical damping profile. Moreover, damping performance may be designed to be different for different directions of oscillation.

Figure 6:
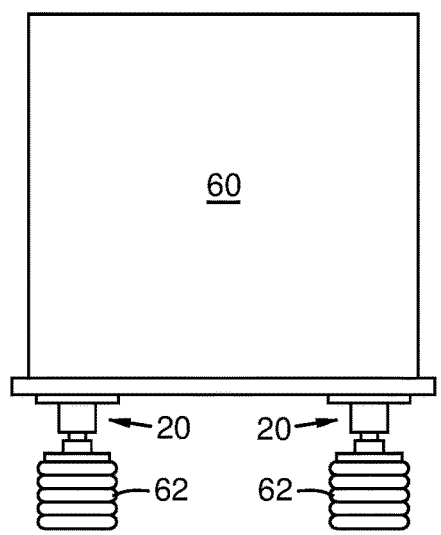
FIG. 6 illustrates a plurality of damping bearing assemblies supporting a structure such as an electrical smoothing reactor.

FIG. 6 illustrates an application of the present invention installed on legs 62 formed with insulators supporting an electrical reactor 60. The supported structure may be anything that experiences lateral loads, such as electrical coils, capacitors, engines, and motors. Alternately, it may be a raised structure that experiences horizontal lateral accelerations from external forces, especially those that are harmonic in nature. In the illustration of FIG. 6, there is no damping in the translational vertical axis. The spherical damping provided by the present device is more effective and efficient for damping such oscillations in minimum space at minimum expense compared to rotary and/or linear dampers. Since the fluid 32 need not be pressurized, there is no pressure loss or leakage. Damping does not rely on pressure, so the fluid can be retained in the containment vessel by gravity alone. The fluid may be selected from available fluids, semi-fluids, tars, gels, and greases in conjunction with designing the containment chamber and deformation element shape and clearance profiles to achieve a desired result in consideration of the fluid properties. A silicone fluid may be selected in one embodiment because it may provide relatively constant viscosity properties over a range of ambient temperatures. Damping does not rely on frictional contact between solid parts (other than incidental damping caused by friction of the supported weight on the bearing), so there may be no frictional contact between any solid parts of the assembly during normal operation except in the ball-joint bearing 34, 36. A stop may be provided if needed to limit excessive deflection.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A damping bearing that provides relative rotations between first and second subassemblies about a point, and damps said rotations in multiple non-parallel planes of a given line through the point,
    wherein the first subassembly comprises a fluid containment vessel with a fluid therein, and the second subassembly comprises a plunger with a fluid deformation element immersed in the fluid, wherein a viscosity of the fluid resists and damps motions of the fluid deformation element in the non-parallel planes resulting from said relative rotations about the point,
    wherein the fluid deformation element is disposed between radially inner and outer lateral fluid-bounding surfaces of the containment vessel, and said surfaces are spherical about the point.

2. The damping bearing of claim 1, wherein the bearing damps the relative rotations in all planes of the given line.

3. The damping bearing of claim 1, wherein the plunger and the fluid deformation element thereon are shaped as a solid of rotation about the given line.

4. The damping bearing of claim 1, wherein the plunger is shaped as a cylinder, the given line is the axis of the cylinder, and the fluid deformation element comprises a flange on a lower end of the cylinder.

5. The damping bearing of claim 1, wherein the plunger is shaped as a cylinder, the given line is the axis of the cylinder, and the fluid deformation element comprises corrugations on a lower end of the cylinder.

6. A damping bearing that provides relative rotations between first and second subassemblies about a point, and damps said rotations in multiple non-parallel planes of a given line through the point,
    wherein the first subassembly comprises a fluid containment vessel with a fluid therein, and the second subassembly comprises a plunger with a fluid deformation element immersed in the fluid, wherein a viscosity of the fluid resists and damps motions of the fluid deformation element in the non-parallel planes resulting from said relative rotations about the point,
    wherein the first subassembly further comprises:
        a bottom mounting plate attached to the fluid containment vessel;
        a support shaft attached to the bottom mounting plate; and
        a ball portion on an end of the support shaft; and
    the second subassembly further comprises:
        a socket portion around the ball portion; and
        a housing retaining the socket portion;
    wherein the plunger is attached to the housing, and the ball and socket portions provide a ball joint interface between the first and second assemblies that enables the relative rotations about the point.

7. The damping bearing of claim 6 and further bearings meeting claim 6 mounted in respective legs supporting an electrical smoothing reactor and damping oscillations thereof in all lateral directions by a damping ratio of over 6%.

8. A damping bearing comprising:
    a first subassembly comprising a fluid containment vessel containing a fluid;
    a second subassembly comprising a fluid deformation element immersed in the fluid; and
    a ball joint bearing that provides relative rotations between the first and second subassemblies about a given point;

wherein the relative rotations are damped by a viscosity of the fluid resisting motions of the fluid deformation element, wherein the first subassembly further comprises a support shaft attached to a bottom mounting plate, the second subassembly further comprises a bearing housing, and the ball joint bearing comprises a ball portion on an upper end of the support shaft and a socket surrounding the ball in the bearing housing.

9. The damping bearing of claim 8 wherein the shaft comprises an axis that passes through the given point, and the damping apparatus damps the relative rotations in multiple non-parallel planes of the shaft axis by a ratio of over 6%.

10. The damping bearing of claim 8, wherein the fluid deformation element is shaped as a solid of rotation about a given line that passes through the given point, and the damping apparatus damps the relative rotations in multiple non-parallel planes of the given line by a ratio of over 6%.

11. The damping bearing of claim 8, wherein the fluid deformation element comprises a flange on an end of a cylindrical plunger that is immersed in the fluid.

12. The damping bearing of claim 8, wherein the fluid deformation element comprises washboard corrugations on an end of a cylindrical plunger that is immersed in the fluid.

13. A damping bearing comprising:

a first subassembly comprising a fluid containment vessel containing a fluid;

a second subassembly comprising a fluid deformation element immersed in the fluid; and a ball joint bearing that provides relative rotations between the first and second subassemblies about a given point;

wherein the relative rotations are damped by a viscosity of the fluid resisting motions of the fluid deformation element, wherein the fluid deformation element is disposed between radially inner and outer lateral fluid-bounding surfaces of the containment vessel, and said surfaces are spherical about the given point.

\* \* \* \* \*